O. WETZEL.
AUTOMATIC LUBRICATOR.
APPLICATION FILED MAY 3, 1913.
1,121,958.
Patented Dec. 22, 1914.
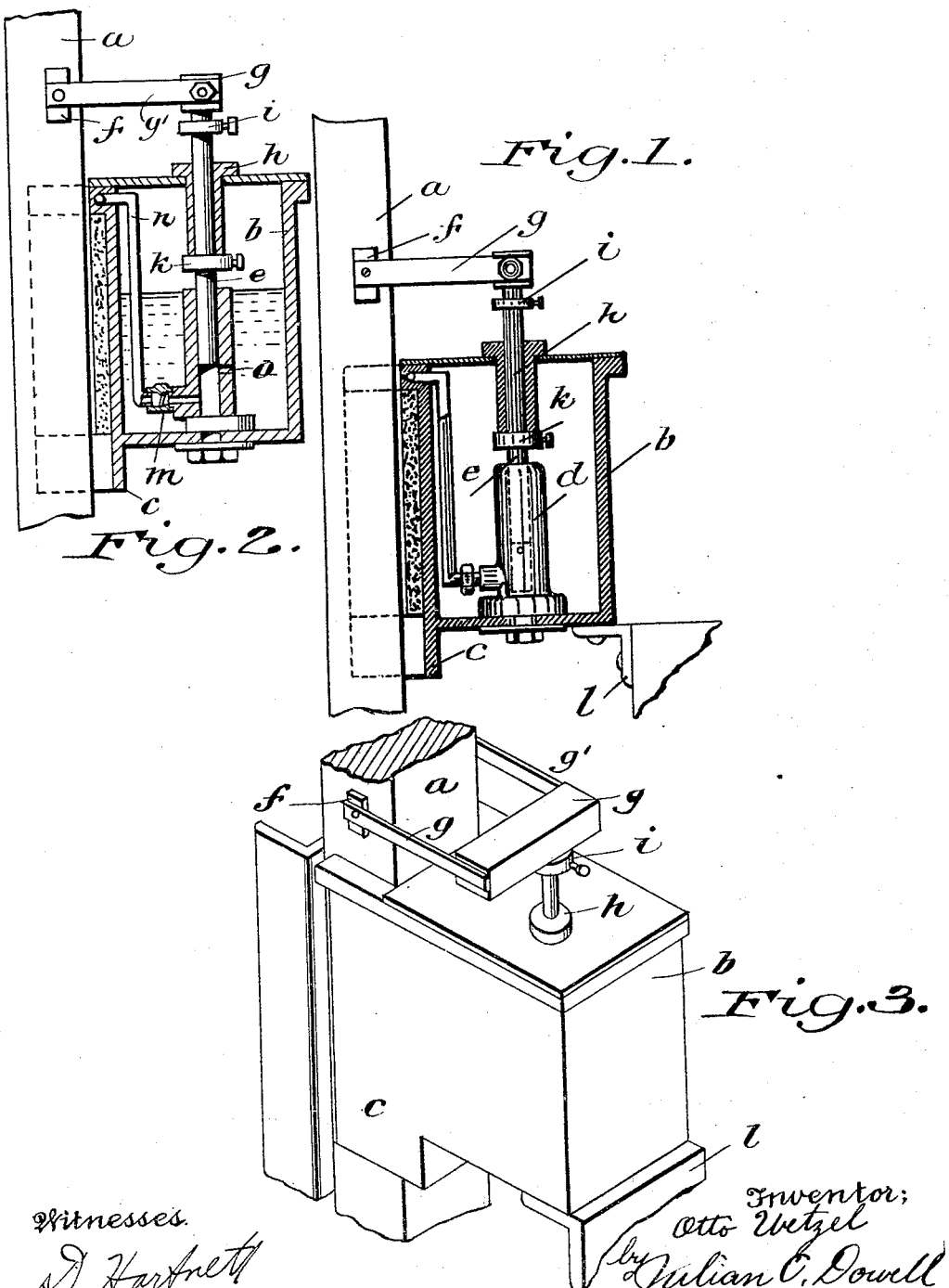

UNITED STATES PATENT OFFICE.

OTTO WETZEL, OF HEIDELBERG, GERMANY.

AUTOMATIC LUBRICATOR.

1,121,958.  Specification of Letters Patent.  Patented Dec. 22, 1914.

Application filed May 3, 1913. Serial No. 765,351.

*To all whom it may concern:*

Be it known that I, OTTO WETZEL, a citizen of the German Empire, residing at Heidelberg, Baden, Germany, have invented certain new and useful Improvements in Automatic Lubricators; and I do hereby declare the following to be a full, clear, and exact description of the invention, such as will enable others skilled in the art to which it appertains to make and use the same.

This invention relates to automatic lubricators for the wearing surfaces of machine parts and it is principally designed for applying oil to the guide rails of elevators.

In the accompanying drawing which illustrates one form of the invention Figure 1 is a sectional view of the lubricator and a section of the guide rail. Fig. 2 is a view of the lubricator showing the pump and valve in section, and Fig. 3 is a perspective view of the exterior of the lubricating apparatus showing a section of the guide rail and a part of the elevator.

Referring to the drawings by letter of reference, $a$ represents the guide rail and $b$ the oil receptacle which runs upon this rail with guide flanges $c$.

$d$ is the pump cylinder and $e$ its piston. Said oil receptacle is secured to the elevator in any suitable manner as by means of an angle iron $l$.

The piston $e$ is slidably mounted in a guide $h$, secured to the oil reservoir, and the pump cylinder, and is provided with two adjustable collars or stops $i$ and $k$ to limit the stroke thereof. To the outer end of the piston is rigidly secured a U-shaped fork, consisting of a base $g$, and two arms $g'$ $g'$ which are adapted to straddle the guide rail. These arms are preferably resilient in order to press the friction blocks $f$ secured to the ends thereof, against the guide rail. There may be provided an outlet valve for the lubricator in the cylinder at $m$ so as to prevent oil in the tube $n$ running back into the cylinder; the oil enters the cylinder through the inlet $o$ no valve being necessary there as the piston on its down stroke covers the opening and cuts off all return of oil to the reservoir.

The action of the apparatus is as follows: As soon as the oil receptacle $b$ connected with the elevator moves upward, the friction device $f$ $g$ remains in place or moves downward in the guide $h$ until the projection $i$ strikes against the oil receptacle $b$ thus forcing the piston downward in the pump and forcing the lubricant out onto the guide rail. On the return motion of the car, the friction device is held fast against the rail $a$ until the projection $k$ strikes the bottom of the guide $h$ whereupon again the entire lubricating mechanism will be carried along the guide rail $a$ downward. By this to-and-fro motion of the friction gear, the piston is also moved up and down and thereby effects the delivery of the lubricant.

Having now particularly described and ascertained the nature of my invention and in what manner the same is to be performed, I declare that what I claim is:—

1. An automatic guide rail lubricating device consisting of a lubricant container movable along the guide rail, a pump carried by said container for discharging the lubricant therefrom, and a lever having one end rigidly connected to said pump and the other being adapted to contact with said guide rail.

2. An automatic guide rail lubricating device consisting of a lubricant container movable along the guide rail, a pump carried by said container for discharging the lubricant therefrom, and a forked lever having its base rigidly connected to the piston of said pump and its two arms being adapted to contact with said guide rail.

3. An automatic guide rail lubricating device consisting of a lubricant container movable along the guide rail, a pump carried by said container for discharging the lubricant therefrom, and a forked lever having its base rigidly connected to the piston of said pump and its two arms being adapted to frictionally engage opposite sides of said guide rail.

4. The combination with a guide rail for an elevator, of a lubricant container adapted to be reciprocated along said guide rail, means for discharging the lubricant from said container upon said guide rail, and a forked device having its base rigidly secured to said discharging means, and its arms frictionally engaging the guide rail for actuating said means.

In testimony whereof I affix my signature in the presence of two witnesses.

OTTO WETZEL.

Witnesses:
FRIEDRICH CARL WENTZEL,
MAX HERMANN HÖPPNER.

Copies of this patent may be obtained for five cents each, by addressing the "Commissioner of Patents, Washington, D. C."